Patented Nov. 15, 1949

2,488,495

UNITED STATES PATENT OFFICE 2,488,495

RESORCINOL AND FORMALDEHYDE CONDENSATION

Alex Malashevitz, Dunellen, N. J., assignor to Catalin Corporation of America, a corporation of Delaware No Drawing. Application August 13, 1947, Serial No. 768,509

2 Claims. (Cl. 260—54)

This invention relates to a process of making synthetic resin adhesives from resorcinol and formaldehyde.

Synthetic resin adhesives have been developed to a very high standard of quality as well as suitability for specific requirements. Where large scale industrial applications of synthetic resin adhesives are based on a series of mechanized operations, as for instance in the plywood industry, the resin solution must be uniform in successive lots.

A given type of synthetic resin adhesive cannot be adapted to all requirements. Phenolic resin adhesives, for instance, possess high water resistance but their curing necessitates relatively high temperatures; therefore, they cannot generally be used as cold setting glues. Urea resin adhesives have the ability to cure quickly at low temperatures but their water resistance is relatively low.

There has long been need of resins of the properties of the polymers from resorcinol and formaldehyde that are quick setting at room temperature and of high water resistance. The resin forming reactions between resorcinol and formaldehyde, however, are extremely violent; uniformity and reproducibility of the resin cannot be attained by the means known for the control of other thermosetting polymers.

There is known a method of making resorcinol resin adhesives which consists in preparing a solution of a permanently fusible resin (using mol ratios of resorcinol to formaldehyde between 1 to 0.5 and 1 to 0.8) and adding to this solution, just prior to its final application as an adhesive, an additional amount of formaldehyde to attain the thermosetting bond. But even at the mol ratios leading to fusible resins only, it is difficult to achieve uniformity and reproducibility of the product.

The prior art has proposed for this purpose a combination of two steps in condensation of the resorcinol with the formaldehyde, dilution of the resorcinol solution with water or other inert diluent which does not react with either resorcinol or formaldehyde, and adding the formaldehyde in successive portions or increments. The fusible resin solution thus prepared is not stable in itself but can be made stable by the addition of alcohols.

I have now found that a fusible resorcinol resin solution of satisfactory uniformity and stability is obtained by using the conventional mol ratios of resorcinol and formaldehyde, but adding the whole amount of formaldehyde at the start of the reaction and effecting the condensation in the presence of acid and methanol in the proportion of at least about 1 mol to each mol of formaldehyde until the mixture comes to have a constant boiling point, then adding alkali catalyst and continuing the reaction until the desired degree of condensation is attained as shown by reaching a substantially constant viscosity of the product, as within a range of 2 poises.

Methanol is the only alcohol that I have found satisfactory in so moderating the reaction as to give to the product the properties of uniformity and reproducibility desired. As stated in greater detail later, it is considered that the mechanism of the moderation and control obtained with methanol involves the temporary conversion of some of the formaldehyde present to an acetal and particularly the hemiacetal of methanol and formaldehyde, with attendant decrease in the concentration of formaldehyde available at the start of the reaction.

It is necessary that the methanol be used in proportion at least approximately equal to 1 mol for each mol of the formaldehyde used. Actually I find somewhat better results when the proportion of the methanol is increased somewhat as there is an increase in the ratio of formaldehyde to resorcinol.

As to the acid which is present in the initial reaction, this is preferably formic acid which occurs as an impurity in the commercial formaldehyde. Ordinarily I do not add any additional acid to catalyze the reaction when the proportion of formaldehyde is in the upper part of the range 0.5 to 0.85 mol for each mol of resorcinol, that is, between 0.7 to 0.85 mol. When the proportion of formaldehyde is in the lower part of this range, say between 0.5 and 0.7, then I prefer to conduct the reaction initially with the acid impurity of the formaldehyde as the only acid present and later to add some additional acid as catalyst.

When additional acid is added, the acid is one of those conventionally used in the acid catalysis of the condensation of an aldehyde with a phenol. It is used in catalytic proportion. Examples of such acid that may be used are formic acid, oxalic acid and benzene sulfonic acid.

Use of the acid in proportion in excess of 1 part for 100 parts of the resorcinol in the reaction mixture leads to difficulty. From the product of the reaction with such an excessive amount of acid there occurs, occasionally at least, precipitation of insoluble material from the mixture after completion of the reaction and cooling of the resulting mixture. To avoid this, I limit the amount of acid used to not more than 1 part for 100 parts of the resorcinol and preferably to 0.001 to 0.5 part to 100 parts of the resorcinol. The lower acidity within this range is used with the higher proportions of formaldehyde to resorcinol.

To define more exactly the difficulties which constitute the problem to be solved by the present invention, it appears necessary to discuss the mechanism of the polymerization reactions involved.

It is generally recognized that the properties of high polymers are conditioned by the distribution of molecular size about an average value. Two separately made batches of the same polymer may show the same mean molecular weight but differ essentially in their physical properties because of a difference in the molecular size distribution. In one batch, the size of the molecules may differ only slightly from one another; in this case the resin solution shows uniformity. In another batch, the size of the molecules may vary widely from the average value; in this case the batch will contain an appreciable amount of relatively very high and relatively very low polymers. These two batches, though having about the same mean molecular weight, will show very different physical properties. For instance, even a small percentage of very high polymers increases considerably the viscosity of the resin solution and its tendency to gel; the presence of very low polymers reduces the usefulness of the resin. If, therefore, an appreciable degree of nonuniformity has been obtained at the start or in the early stages of the polymerization process, the process either gets completely out of control or yields nonuniform products that are not duplicated in successive runs.

Molcular size distribution depends primarily on the reaction rate of the initial reactants. At room temperature and at a pH of around 4, the rate or speed of the reaction between resorcinol and formaldehyde is low; the heat required to initiate rapid reaction, however, is very low also. Since this reaction is highly exothermic, only a small amount of external heat required to initiate rapid reaction is supplied, so that the reaction proceeds at a self-accelerating pace, due to the internally developed heat. If the formaldehyde is present in amounts greater than 0.5 mol of formaldehyde to 1 mol of resorcinol, the rate of reaction becomes so accelerated as to make ineffective the usual means of cooling the solution to the temperature at which the reaction could be controlled.

It has been proposed to counteract the self-accelerating speed of this reaction by decreasing in effect the concentration of the two reactants, resorcinol and formaldehyde, as stated above. Under these conditions, the reaction does not get out of control, insofar as the overall temperature is concerned, but each additional portion of formaldehyde added causes local overheating. At the time the additional portions of formaldehyde are introduced, the solution has already attained a high temperature, certainly high enough to activate the resorcinol-formaldehyde reaction at once and to increase its speed to violence. Now, in whatever manner the additional portion of formaldehyde is mixed into the reaction solution, there will always be a local excess of formaldehyde in these regions where the formaldehyde first enters. No matter how short lived this local excess may be, it suffices to form some of the very high polymers. In fact, each addition of formaldehyde to the hot reaction solution brings about a relatively large increase in the viscosity of the resin solution.

If, however, resorcinol and formaldehyde in mol ratios leading to fusible resins are reacted in the presence of the methanol until a constant boiling point is attained, the resulting resin solution is of extremely low viscosity, easily reproducible, and of excellent adhesive properties.

No other alcohol or solvent tested was suitable. In this reaction, the boiling point of the mixture is considered practically constant when the change in boiling point for 30 minutes' additional refluxing is slight, say not more than about 0.5° C.

In establishing satisfactory reaction velocity, ethanol is not satisfactory, particularly with high molar ratios of formaldehyde to resorcinol within the range stated above.

Methanol, under proper conditions of pH and water concentration, forms a relatively stable hemiacetal which in the resin solution remains in dynamic equilibrium, according to the following equation

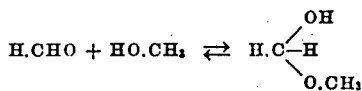

The proportion of methanol and water in the system determines the amount of free formaldehyde available at any time to react with the resorcinol. For this reason it is possible to charge the entire amount of formaldehyde initially and still have only a limited amount available in free condition for reaction. As the system is heated to refluxing temperature, the reaction does not become violent. As the reaction continues, there is release of the formaldehyde from the hemiacetal in order to maintain equilibrium. A uniform resinous condensation product is formed because at no time is there more than the optimum amount of formaldehyde to react with the resorcinol. For each mol ratio of resorcinol to formaldehyde there is an optimum and a minimum amount of methanol which must be added for satisfactory reaction rate control. The amount of methanol used depends on the amount of water added and present in the system. There exists a definite water to methanol ratio which is optimum for a given resorcinol to formaldehyde ratio. For example, if too much methanol is used, then very long reaction periods are necessary to achieve suitable condensation. Conversely, if too much water is present, then the reaction rates are too rapid. It is considered that the effect of the excess of water in decomposing the hemiacetal, and thus liberating formaldehyde, more than offsets the expected retarding effect due to dilution by the added water.

The particular advantages of the present invention become more apparent in considering the dependence of the rate of these reactions on the concentration of catalysts. It is known that the rate of reactions between resorcinol and formaldehyde is the lowest in the presence of small amounts of acid catalyst which brings the pH of the initial solution to about 4.0. In fact the mixture of resorcinol, formaldehyde and methanol may be and preferably is first reacted without adding any catalyst other than the formic acid normally present in commercial formaldehyde.

Such a small amount of an acid catalyst in the presence of methanol does not carry the condensation very far but is sufficient to start a reaction whose exothermic character may be readily controlled so as to yield uniform products. The initial addition of large amounts of acid catalyst would increase the violence of the reaction and, therefore, lead to non-uniform products. Once the reaction has been initiated and partly effected in the presence of very small amounts of acid catalyst, further addition of acid catalyst may be made without increasing unduly the rate of reaction because part of the reacting materials have been consumed and their concentrations decreased in the initial reaction phase. The reaction rate may be and suitably is increased by the addition of water without increasing the acid catalyst. The present invention takes full advantage of the low reactivity of the mixture containing the methanol while previous workers in this field have been compelled to resort to further dilution in order to prevent the formation of high polymers.

Acid catalysts alone are not capable of producing a fusible resorcinol resin of the desired characteristics. An aqueous solution of an acid catalyzed resorcinol resin of the fusible type is unstable even in the presence of added alcohol. To make the desired stable resin, it is necessary to add a basic catalyst and continue condensation for the purpose of completing the reactions and obtaining stability. The basic catalyst is added in catalytic proportion and is of the kind that is usually required for formaldehyde-resorcinol condensation, as, for instance, sodium or potassium hydroxide in amount to raise the pH to approximately 5 to 9, and preferably 6.5 to 8.

Alkalies have a much stronger catalytic effect on the reactions between resorcinol and formaldehyde than acid catalysts. Therefore, if alkali is added to a solution of a fusible resorcinol resin which has been catalyzed by acids only, vigorous exothermic reaction ensues. The rate of the reaction depends on the degree of polymerization and on the molecular size distribution which the resin has attained in the acid phase. If the alkali is added too soon, violent exothermic effects are produced; if it is added too late, i. e. after the excessively long acid condensation, the resulting resinous product again precipitates out on standing even in alcoholic solution. Large amounts of an acid catalyst with a short reaction time will produce the same effect of precipitation as an inadequate amount of acid with a long reaction time. To obtain the best results it is necessary, therefore, that the acid condensation phase be capable of control as to proportion of acid catalyst, the water to methanol ratio, and time of condensation.

From what has been said before it is evident that my method ensures proper control of the acid reaction phase. When the reaction between resorcinol and formaldehyde is carried out according to this method, the polymers formed in the presence of an acid catalyst are low and of relatively uniform molecular size distribution; therefore the solution may be refluxed in the presence of an acid catalyst until the acid condensation has been completed, that is, until a constant boiling point of the mixture has been reached. When alkali is added after this point has been reached, polymerization continues without violence and without substantial increase in viscosity. The result is a fusible type resin that may be prepared in a concentrated solution (higher solids content) without decrease of stability and undue increase in viscosity. Since the molecules grow uniformly during the acid catalysis phase and since the acid phase is carried to completion as indicated by the constant boiling point of the reaction solution, the end product is easily duplicated in successive preparations. It is possible to produce and reproduce a solution of a homogeneous fusible resorcinol resin of low viscosity and high solids content from relatively high mol ratios of resorcinol and formaldehyde (1 resorcinol to 0.75 formaldehyde) without resorting to excessive dilution of the resin solution with water or other solvent to prevent precipitation or gelation. If a resin solution of approximately 60% solids, 20% alcohol, and viscosity 5 to 10 poises, for example, is desired, then conventional methods would be based on a resorcinol-formaldehyde ratio of 1:0.65 whereas the present invention permits the use of a 1:0.75 mol ratio.

The specific technological advantages arising from the present invention become more evident in considering the conditions under which resorcinol resin glues are applied in practice. A little reflection will show that, for practical purposes in formulating a so-called fusible type resin without sacrificing its reactivity, it is desirable to react as much formaldehyde as possible. If too much formaldehyde is used with a given method of reaction, however, non-uniform products are formed and the subsequent addition of formaldehyde, to obtain a thermosetting adhesive resin for room temperature bonding of wood, will produce a relatively slow curing, non-uniform bond. Conversely, if the mol ratio of formaldehyde is too low, say 0.5 to 1 resorcinol, then the resin may be of uniform quality but far too much formaldehyde must added, at the time of use as an adhesive, to obtain thermosetting qualities. The heterogeneous character of the mix produces bonds of inferior quality. Best results are obtained with a resin which has been reacted with as much formaldehyde as possible, without sacrificing its reactivity rate or degree of uniformity and to which a minimum amount only of additional formaldehyde need be added to obtain thermosetting properties.

The invention will be illustrated in greater detail by the following illustrative examples, proportions in these examples and elsewhere herein being expressed as parts by weight unless specifically stated to the contrary.

Example 1

Dissolve 110 parts of resorcinol (1 mol) in 10 of water and 30 of methanol, by warming to 25–30° C. Add 49 parts of 37% formaldehyde solution (0.6 mol). Then heat gently to reflux. Continue at reflux until a boiling temperature is reached that is substantially constant over a half hour period, and then add sufficient alkaline catalyst (KOH, NaOH, etc.) to adjust to a pH of 6–8. Reflux 15 minutes longer and cool. The initial catalyst in this reaction is the small amount of formic acid normally found in aqueous formaldehyde.

The product is a solution of a fusible, i. e. non-thermosetting resin of uniform quality.

Example 2

The composition and procedure of Example 1 are used except that the 10 parts of water added as such are omitted.

The product is a solution of a fusible resin of higher total solids percentage than obtained in Example 1.

Example 3

The composition and procedure of Example 1 are followed except that the proportion of methanol used is reduced from 30 parts to 15.

The product is similar to that obtained in Example 1 but there is a somewhat higher concentration of the resin in the solution and also a lower proportion of the methanol to water.

*Example 4*

The procedure of Example 1 is followed except that the proportions of material used are as follows:

| | Parts |
|---|---|
| Resorcinol (1 mol) | 110 |
| Water | 30 |
| Methanol (1.3 mols) | 35.2 |
| 37% formaldehyde (0.7 mol) | 57 |

*Example 5*

The composition and procedure of Example 1 are followed except that the proportions of the several materials used are as follows:

| | Parts |
|---|---|
| Resorcinol | 110 |
| Methanol | 35 |
| 37% formaldehyde solution | 57 |

This composition represents a ratio of 0.7 mol of formaldehyde to 1 mol of resorcinol. Although the molar ratio of formaldehyde to resorcinol is rather high, the product is fusible and particularly satisfactory for use as an adhesive.

*Example 6*

Example 5 is modified by the addition of 30 parts of water during the refluxing period, that is, prior to reaching the boiling temperature that is substantially constant over a half hour period. The effect of the water is to increase the speed of the condensation. It reduces the time of refluxing to give the substantially constant boiling mixture.

*Example 7*

The procedure of Example 1 is followed except that the proportions of material used are as follows:

| | Parts |
|---|---|
| Resorcinol (1 mol) | 110 |
| Water | 30 |
| Methanol (1.8 mols) | 57.6 |
| 37% formaldehyde (0.8 mol) | 66 |

*Example 8*

The composition and procedure of Example 7 are followed except that the 30 parts of water present initially in Example 7 are omitted and 30 parts of water are added during the period of refluxing prior to arriving at the mixture of substantially constant boiling temperature.

*Example 9*

The procedure of Example 1 is followed except that the proportions of the materials used are as follows:

| | Parts |
|---|---|
| Resorcinol | 110 |
| Methanol | 32 |
| Water | 32 |
| 37% formaldehyde | 65 |

*Example 10*

The composition and procedure of Example 9 are used but the 32 parts of water are not added initially but at reflux before reaching the constant boiling point.

*Example 11*

The composition and procedure of Example 9 are used but no water added. There is added an additional 32 g. of methanol at reflux prior to reaching the constant boiling point.

*Example 12*

| | Parts |
|---|---|
| Resorcinol | 110 |
| Methanol | 32 |
| 37% formaldehyde in aqueous solution | 69 | are heated to reflux and the reflux continued until a substantially constant boiling point temperature is reached. There is then added an additional 64 parts of methanol, after which sodium hydroxide is added in proportion to raise the pH of the system to approximately 7 and the reaction continued until a viscosity of 5 to 10 poises is obtained, the viscosity being measured by standard methods after the solution is cooled to room temperature.

Although the molar ratio here is very high, namely, 0.85 mol of the formaldehyde to 1 mol of resorcinol, the product, as in all the examples above, is a fusible resin.

*Example 13*

| | Parts |
|---|---|
| Resorcinol | 110 |
| Methanol | 32 |
| Water | 0–32 |
| 37% formaldehyde solution | 48 to 65 |

The above mixture is heated to reflux and refluxed until a substantially constant boiling temperature is reached. Then sodium hydroxide is added in proportion to raise the pH to approximately 7 and the reaction continued until a viscosity of 5 to 10 poises is obtained, the viscosity being tested at room temperature.

This example is included to show ranges of the various materials within the range stated for it gives a fusible resin due to the retarding effect of the methanol on the rate of condensation.

The procedure of any of the numbered examples above may be modified by the inclusion of additional solvents or other alcohols for their diluting effect, the said solvent or other alcohol being added to advantage at the conclusion of the reaction described. Such solvent or other alcohol is added when required in the particular use to which my solution is to be put. Thus, I add about 5% of glycol, on the weight of the finished solution of Example 1, to make a product particularly suitable for use as a surface coating resin.

It will be understood that it is intended to cover all changes and modifications of the examples of the invention herein chosen for the purpose of illustration which do not constitute departures from the spirit and scope of the invention.

What I claim is:

1. In making a stable solution of a fusible resin, the method which comprises forming a solution of resorcinol, aqueous formaldehyde in the proportion of 0.5 to 0.85 mol of actual formaldehyde to 1 of the resorcinol, and methanol in the proportion of at least about 1 mol to 1 mol of the formaldehyde, establishing the pH of the solution at about 4, maintaining the solution at approximately the temperature of refluxing at atmospheric pressure until the boiling point of the solution remains practically constant, then adding a basic catalyst in amount to establish the pH substantially above the previously established pH and within the range 5 to 9, continuing the reaction until the viscosity remains substantially constant, and cooling the resulting product.

2. In making a stable solution of a fusible resin, the method which comprises forming a solution of resorcinol, aqueous formaldehyde in the proportion of 0.5 to 0.85 mol of actual formaldehyde to 1 of the resorcinol, an acid catalyst added in proportion to establish the pH of the solution at about 4, and methanol in the proportion of at least about 1 mol to 1 mol of the formaldehyde, warming the solution to a condensation temperature of at least 40° C., maintaining the solution at the condensation temperature until the boiling point of the solution remains practically constant over a 30-minute period, then adding basic catalyst in proportion to raise the pH to a level substantially above the pH previously established and within the range 5 to 9, continuing the warming until there is no further substantial increase in viscosity, and cooling the resulting product, the methanol being present at all stages from the time of contact of the formaldehyde with the resorcinol up to and including the cooling step and serving as a retarder of condensation of the resorcinol and formaldehyde.

ALEX MALASHEVITZ.

REFERENCES CITED

The following references are of record in the file of this patent:

UNITED STATES PATENTS

| Number | Name | Date |
| --- | --- | --- |
| 2,414,415 | Rhodes | Jan. 14, 1947 |
| 2,443,197 | Rhodes | June 15, 1948 |